United States Patent [19]

Gendrot

[11] 4,176,342
[45] Nov. 27, 1979

[54] ELECTRICAL CONTROL SYSTEMS FOR TRANSMITTING SIGNALS OF DIFFERENT MAGNITUDES

[76] Inventor: Andre Gendrot, 78 Boulevard Ornano, 75018 Paris, France

[21] Appl. No.: 863,323

[22] Filed: Dec. 22, 1977

[30] Foreign Application Priority Data

Dec. 24, 1976 [FR] France ............................. 76 39037

[51] Int. Cl.² .............................................. H04Q 3/00
[52] U.S. Cl. ................................. 340/166 R; 340/172
[58] Field of Search ............ 340/166 R, 172, 347 AD; 179/18 GF

[56] References Cited

U.S. PATENT DOCUMENTS 3,725,865   4/1973   Fairchild .............................. 340/172

Primary Examiner—Harold I. Pitts
Attorney, Agent, or Firm—Steinberg & Blake

[57] ABSTRACT

An electrical control system includes a matrix made up of electrically conductive lines and columns which cross each other at predetermined locations where a plurality of connecting circuits are provided for respectively electrically connecting the lines and columns to each other at selected locations. The connecting circuits respectively include Zener diodes respectively having threshold voltages distributed among a plurality of different threshold voltages of different discrete magnitudes. The level of the signals supplied to the lines can be correspondingly modulated. A receiving structure electrically connected to the columns for receiving output signals therefrom includes components having thresholds of detection corresponding to the magnitudes of the threshold voltages of the Zener diodes of the connecting circuits. These components of the receiving structure include operational amplifiers polarized by Zener diodes which are connected in cascade. By way of the invention it is possible to achieve from a single matrix a number of functions which normally would require the use of a plurality of superposed matrices.

9 Claims, 2 Drawing Figures

ELECTRICAL CONTROL SYSTEMS FOR TRANSMITTING SIGNALS OF DIFFERENT MAGNITUDES

BACKGROUND OF THE INVENTION

The present invention relates in general to devices for decoding and/or programming complex or sequential information.

The present invention relates in particular to devices of this type which includes a matrix constituted by electrically conductive lines and columns which are insulated from each other and which cross each other at predetermined locations where they can be selectively connected to each other so as to achieve in this way a number of selected connections between the lines and columns at the locations where they cross each other.

In a well known manner, the connection between a line and column where they cross each other is achieved by providing a simple short circuit between the line and column at a selected location where they cross each other. However, a connection including a passive element such as a resistor or a non-return diode permits an electrical connection of a line toward a column while assuring a disconnection in the opposite direction from the column toward the line.

In this way for a given distribution of connections between the lines and columns, there will be for all of the input signals supplied to the lines a linear combination of output signals available at the columns which are connected to the lines. If several input signals are simultaneously applied to different lines, the result is a complex output signal formed by decoding in a manner determined by the positions of the connecting plugs or the like which can be selectively manipulated for providing predetermined connections between the lines and columns. It is to be noted that this output signal cannot in any case include more elements than the number of columns of the matrix. This fact is also true even in the case where there is a decoding of input signals which are successively applied to different lines, for example by exciting the latter sequentially or cyclically with a suitable timed distribution of the input signals in order to provide a program for a complex task, such as an operating cycle for a transfer machine or for illuminating and operating an establishment such as a warehouse, department store, or the like.

While there is of course a freedom to select connections to be provided at locations where the lines and columns cross each other, so as to modify in this way the particular type of decoding, matrix devices of the above type, which are presently known, can only provide for each simple or complex input signal a single and unique linear combination of output signals the number of which can at most equal the number of columns of the matrix. In other words, such known devices can only provide a univocal decoding, even in the case where several similar matrices are stacked in order to provide for handling and/or supply of signals made up of more elements than those consisting only of lines and columns, respectively.

SUMMARY OF THE INVENTION

It is accordingly a primary object of the present invention to avoid the above drawbacks.

Thus, it is an object of the present invention to provide a construction which makes it possible to achieve from a single decoding and/or programming matrix output signals which on the one hand can be composed of more elements than the number of columns of the matrix and which on the other hand correspond to different combinations of input signals applied to the same set of lines.

In other words, it is an object of the present invention to provide by way of a single matrix a plurality of decoding and/or programming functions which normally would require the use of a plurality of superposed and suitably interconnected matrices, according to several different known dispositions.

Thus, the invention has for its object a decoding and/or programming device in the form of a network which can be modified and which is of a type which includes a matrix made up of mutually insulated electrically conductive lines and mutually insulated electrically conductive columns, which can be selectively connected electrically to each other at the locations where they cross each other, while utilizing a signal supply means capable of supplying a group of input signals in a timed manner, for example, so as to apply selectively an exciting signal at the input to each line, while also utilizing a receiving means coupled to the outputs of the columns so as to produce when excited signals which can be used for predetermined purposes.

According to the invention, such a device is primarily characterized in that a connecting means at each of the locations where the lines cross the columns includes a connecting circuit for selectively connecting a line and column to each other with this circuit including a Zener diode positioned inversely between the line and column and having a threshold voltage, at which it assumes an ON condition, of a particular magnitude selected from among a number of such discrete magnitudes which have different values. Thus several Zener diodes of the several connecting circuits for selectively interconnecting the lines and columns at the locations where they cross each other respectively include Zener diodes which respectively have such threshold voltages distributed among a number of threshold voltages of different discrete values. The receiving means which receives the signals from the columns is capable of detecting signals according to the outputs received from the columns and utilizing these detected signals for predetermined purposes. Either the group of signals supplied by the supply means or the group of detected signals detected by the receiving means, or both, also have voltage magnitudes distributed among a number of different voltage magnitudes which respectively correspond with the different threshold voltage magnitudes of the above Zener diodes.

In this way, for each magnitude of exciting voltage applied to a given line of the matrix by way of the supply means, it is only possible to excite those components of the receiving means which have a threshold of detection less than the particular magnitude of the threshold voltage of the Zener diode which is in the circuit which couples the particular line to the particular column. The maximum value of the exciting voltage is of course selected to be greater than the greatest Zener diode threshold voltage, augmented by the weakest voltage which can be positively detected if it is assumed that there is no detection of zero signals, without utilizing certain diodes which never provide a connection and thus would be superfluous.

Thus, by way of the present invention it is possible to provide at the several connecting circuits which can selectively interconnect the lines and columns of the matrix where they cross each other several different series of Zener diodes with the Zener diodes of one series having a given threshold voltage while the Zener diodes of another series have a different threshold voltage, and so on, while taking into account the possible modulation of the magnitudes of the input signals and the different thresholds of detection of the receiving means, so that in this way the single matrix of the invention can behave as if it were a matrix-type of device which included a large number of different virtual levels of connection. This number is of course multiplied by the fact that at each output column there can be coupled thereto several receiving components of different sensitivities which thus can be selectively excited according to the magnitude of the input signal and the threshold voltage of the Zener diode connected therebetween.

It is of advantage to provide a receiving means made up of operational amplifiers which have an extremely high input impedance and which in response to an extremely weak signal are capable of being brought to a saturated condition for supplying a useful output voltage. One of the input terminals of each amplifier is electrically connected to a column of the matrix while the other input terminal is electrically connected to a reference potential through a polarizing circuit which fixes the threshold of detection. Such a polarizing circuit can advantageously be formed by a chain of Zener diodes connected in series between one input of a first operational amplifier and the point of reference potential, the corresponding inputs of the other amplifiers being branched between the successive diodes.

In order to be able to detect a zero signal (in the absence of an input signal and/or of a connection between a line and column, or when the input voltage is less than the threshold voltage of the interposed Zener diode), there is an additional operational amplifier means which can be coupled in an inverse manner at its inputs between the column of the matrix and the point of reference potential. This latter signal can be either a zero signal or a signal of a given end value, which may be identical or not identical for the different columns, so that in this way it is possible to increase the variety of combinations which can be handled by way of the structure of the invention.

It is to be noted that there are advantages in utilizing operational amplifiers which operate in a saturated condition and which provide output signals which are identically calibrated and which are at a level sufficient to be immediately utilized by circuits or components controlled by way of the device of the invention. In particular, in the case of a timed program, signals for starting and stopping an operation can be supplied to a bistable unit controlled by amplifiers connected to the same column but having different distinct thresholds of detection, and of course selectively excited either from the same line which successively receives input signals of different magnitudes or from two lines connected to the particular column by Zener diodes which have different threshold voltages and which successively receive the same input signal. More elaborate combinations can be utilized for purposes of greater complexity, for example in order to successively modify the contents of a register.

It is therefore apparent that by way of the present invention it is possible to provide relatively complex decoding or programming by way of a device which includes only a single matrix of the above type which of course forms the equivalent of a stack which includes a relatively large number of virtual levels of connection which can be selected and modified at will.

BRIEF DESCRIPTION OF DRAWINGS

The invention is illustrated by way of example in the accompanying drawings which form part of this application and in which:

FIG. 1 is a fragmentary schematic illustration of one possible device according to the invention utilized, for example, to provide a timed program capable of producing, for example, an automatic control of devices used in the operation of a warehouse, retail establishment, or the like.

DESCRIPTION OF PREFERRED EMBODIMENTS

It is of course to be understood that in the example described below for illustrating the invention, the choice of elements and functions is arbitrary.

Figure 1:
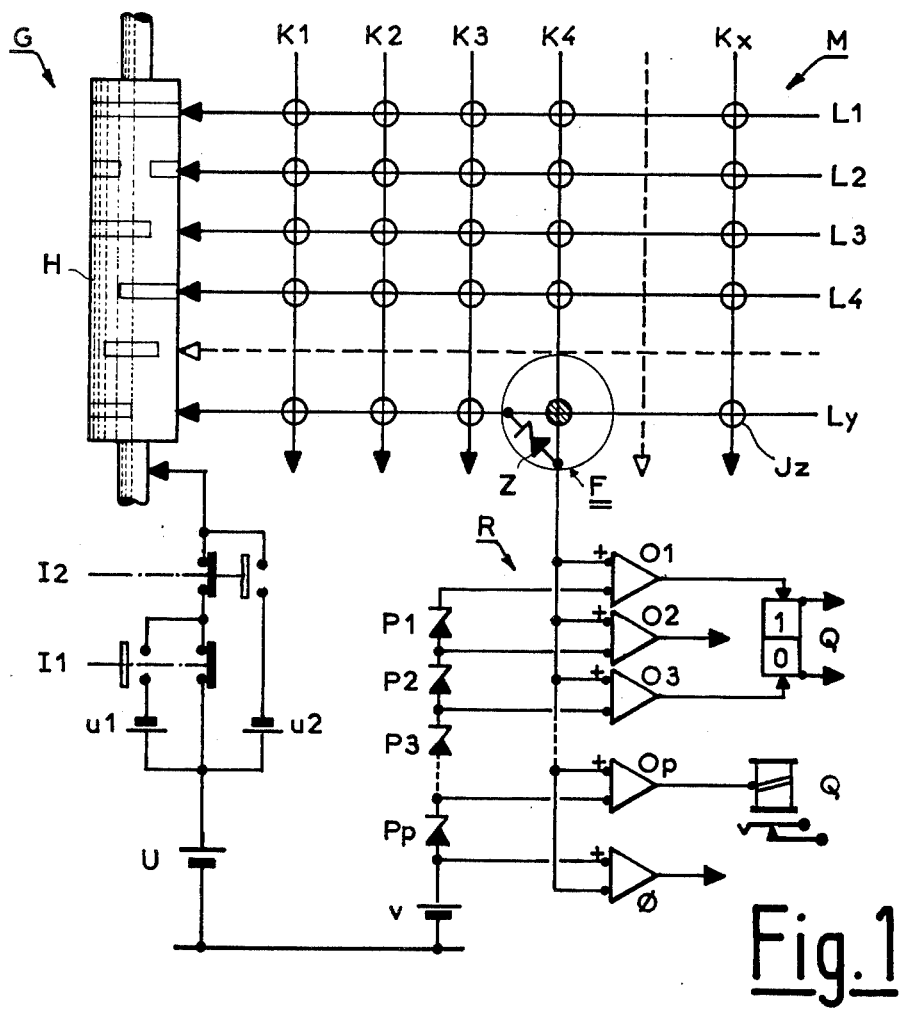

The structure which is schematically illustrated in FIG. 1 includes a supply means G for selectively supplying input signals to a plurality of lines L1, L2, L3, L4 . . . Ly of a matrix M which includes a plurality of columns K1, K2, K3, K4 . . . Kx which cross the lines and which on the one hand can be selectively connected to given lines at the crossing locations, such as the location Jz, while on the other hand they are electrically connected respectively to a plurality of receiving means R, of which one receiving means R is shown electrically connected to the column K4.

The supply means G includes a rotary timing commutator H which is electrically connected to a switch means which includes the switches I1 and I2, this switch means in turn being electrically connected to a voltage source U while the elements u1, and u2 are connected in opposition between the voltage source U and the switches I1 and I2. Thus, the timing commutator H is formed by a rotary cylindrical drum made of electrically non-conductive material and carrying at its outer surface arcuate electrically conductive contact strips which are axially and circumferentially distributed at the outer drum surface and which slidably engage contacts at the ends of the lines in the manner shown schematically in FIG. 1. Thus for the several matrix lines which are illustrated in FIG. 1 the drum carries circumferential conductors which are suitably interrupted. These conductors are each electrically connected to a metallic interior shaft of the drum, the shaft and drum rotating at a unit and being driven by a suitable drive which will, for example, turn the drum through a complete revolution in 24 hours so that a given angular position of the drum corresponds to a given time of day. The shaft of the rotary drum is electrically connected through a slip ring, for example, to the switch assembly I1, I2. These switches I1, I2 normally short circuit, respectively, the two components u1, u2 which generate a counterelectromotive force or which provide a predetermined voltage drop, these components u1, u2 being illustrated as batteries, while in fact they may advantageously be formed by Zener diodes connected in an inverse position. This structure receives its energy from the voltage source U which is also illustrated as taking the form of a battery while in fact it may be formed by a rectifier and filter associated therewith or by a number of batteries.

The above supply means is illustrated only to show that it applies at the input of the matrix M a variable group elementary input signals arranged to present in fact signals of different distinct magnitudes in accordance with whether the switch means I1, I2 is positioned to provide a supply from the voltage source U, a supply of voltage corresponding to U-u1, or a supply determined by the voltage U-u2, in accordance with the particular position selected for the switches I1, I2. An arrangement of this type can be utilized, for example, to control the operation of illuminating units, heating units, security units such as locks, alarms, and the like, and other installations utilized in the operation of an establishment such as a warehouse, department store, or the like. These switches I1, I2 are set so as to provide for different types of operation such as operation of such an establishment during the night when it is closed, or during week ends and holidays when it is closed, or during normal operating intervals when such an establishment is open for business, the drum of the commutator H being driven by a synchronous clock so as to have an angular position corresponding to the particular time of day.

The matrix M includes an electrically non-conductive support such as a suitable frame or panel which carries the two crossing layers of lines and columns each formed by a series of electrically conductive bars which are provided at the locations where they cross each other, the number of these locations being equal to the product of the number of lines and number of columns, electrically conductive clips or other components capable of cooperating with axially movable connecting plugs which form a plurality of connecting means F respectively situated at the several crossing locations of the lines and columns. The particular construction of each connecting means F is described below in connection with FIG. 2. However, each connecting means F which serves to selectively provide a connection between a selected line and a selected column at the location where they cross each other includes a connecting circuit which has a Zener diode Z connected in an inverse position between a line and column and having a predetermined threshold voltage selected from among a plurality of different discrete threshold voltages of different magnitudes, these magnitudes of the threshold voltages of the Zener diodes being, for example, equal to predetermined entire fractions of the voltage supplied by the voltage source U. The connecting circuit of each connecting means F includes in addition to the above-mentioned Zener diode an ordinary diode D connected in series with the Zener diode but having an inverse polarity, so as to assure in this way, in a known manner, a reliable disconnection of the connection in a direction from the column toward the line.

It is thus apparent that the only connections which can be effectively provided between a line and column are those which can pass through the particular connecting circuit whose Zener diode has a threshold voltage less than the voltage of the applied input signal, and that the difference between these voltages will only be available at the particular column which receives the signal. Thus if such a column is electrically connected with a plurality of lines by connecting circuits which include Zener diodes having different threshold voltages, then only the connecting circuit which has the Zener diode of the smallest threshold potential will be operative and will thus provide the largest output voltage. It follows, therefore, that for all possible combinations of a given position of the drum H, the setting of the switches I1, I2, the positions of the several connecting means F at the matrix M, and the threshold voltages of the Zener diodes incorporated into the connecting circuits, the output signal which is available at each column will either be zero or equal to one of several possible voltages which are graduated at different magnitudes as a function of the individual values of the different parameters referred to above.

A number of receiving means R are respectively connected with the columns, with one of these receiving means R being shown in FIG. 1. Thus, the several receiving means R are capable of operating advantageously in response to the above selected distribution of different output magnitudes. Thus, as is shown for the column K4, the receiving means includes, for example, a plurality of operational amplifier means O1, O2 . . . Op. Each of these operational amplifier means has a pair of inputs, and it will be seen that the + inputs thereof are all connected in parallel to the particular column. The other inputs of the several operational amplifier means are respectively connected to terminals respectively situated between a chain of polarizing elements P1, P2 . . . pp, connected in cascade, and in fact taking the form of simple Zener diodes. This series of polarizing elements is connected to the same point of reference potential as the voltage source U. However, this connection to the source of reference potential is provided through an element v which generates a suitable counterelectromotive force or a predetermined voltage drop.

It is of course known that such operational amplifiers have an extremely high input impedance, and as a consequence will not operate in opposition to each other in a network as illustrated. Such operational amplifiers can easily be placed in a saturated condition by a signal which need exceed only an extremely small critical value, at most on the order of a few hundreds of millivolts, while even a signal greatly in excess thereof will have no damaging influence on the amplifier. Thus, in the illustrated network the several amplifiers O1, O2 . . . Op each detect all signals which exceed a predetermined level and all provide in response thereto a signal at the same level of saturation.

As a consequence, for each value of an output signal available at a given column, the operational amplifiers connected thereto are excited according to a predetermined combination, as a function of their thresholds of detection. The complex information which is thus achieved by decoding the input signals is univocal and can be utilized as required, for example in the manner illustrated in order to operate the bistable unit Q or to energize the relay Q'. It is to be noted that signals for starting and stopping a given operation can be achieved by applying to the same line which is connected to the same column by the same connecting means input signals of different magnitudes.

An additional parameter can be introduced to influence different columns by way of elements v which are arranged to provide different reference levels or which are adjustable. Finally, each receiving means R may be provided with an additional operational amplifier means φ which can be situated at the bottom of each chain and which has its inputs connected inversely with respect to the inputs of the other operational amplifiers, with a view to detecting output signals of zero level, if necessary.

In order to utilize all or part of the above-described structure, only a single decoding and/or programming matrix is required to assure the obtaining of a multiplicity of complex functions which otherwise would have required, according to known techniques, the stacking of several levels of connections. In fact, the number of virtual levels of connections thus added increases as a factorial function of the number of independent parameters which are utilized, such as the different magnitudes of the input signals, the different magnitudes of the thresholds of detection of the amplifiers, the level of reference potential applied to a particular column, and above all the different magnitudes of the threshold voltages of the Zener diodes which are incorporated into the connecting circuits which form part of the plurality of connecting means F, these magnitudes being graduated as determined by the different parameters.

Figure 2:
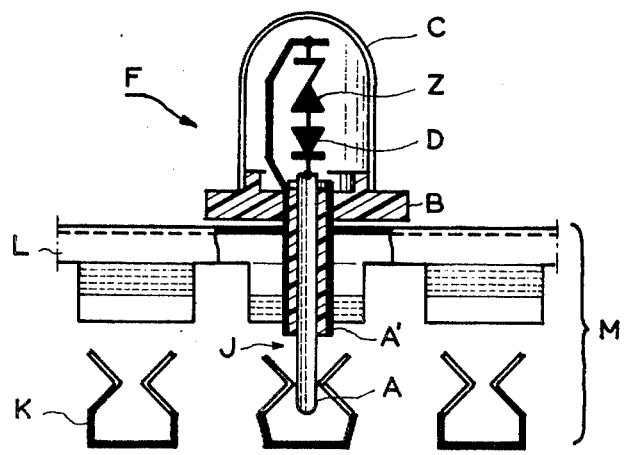
FIG. 2 is a fragmentary partly sectional schematic illustration of a connecting means utilized with the device of the inventions.

FIG. 2 illustrates one possible embodiment of a connecting means of the invention. Thus, FIG. 2 shows, schematically, in a fragmentary manner for the matrix M a plurality of columns K which are shown in cross section and a plurality of lines L one of which is shown in FIG. 2 extending across the illustrated columns K. These columns and lines of course are formed by elongated conductive bars of channel-shaped configuration as illustrated. The lines L are of the same construction as the columns K, but they are mounted so as to be in an inverted position with respect to the columns K, as illustrated. At each location where a line L crosses a column K, the line L carries at the edges of its side walls a pair of V-shaped springy gripper elements, these elements being directed downwardly, as viewed in FIG. 2, while each column K has in the same way a pair of V-shaped springy gripper elements directed upwardly toward a line L where the latter crosses the column K, as illustrated in FIG. 2. The springy electrically conductive gripping elements of each line L at a crossing location thereof may be spaced from each other at a distance somewhat greater than the spacing between the corresponding gripping elements of the column K, and of course the pair of elongated gripping elements of the column K at each crossing location extend perpendicularly with respect to the pair of gripping elements of the line L at the same location. In addition, as can be seen from FIG. 2, the upper wall of the line L is formed with an opening passing therethrough.

The several connecting means F are situated at the several crossing locations J, as shown for the particular connecting means F illustrated in FIG. 2. Each connecting means F includes an elongated electrically conductive rod A which extends through and is frictionally held by a sleeve of electrically non-conductive insulating material, this sleeve in turn being surrounded by and carrying an outer electrically conductive tube A'. This conductive tube A' in turn extends through and is held by a base B made of an insulating material and forming part of an operating key structure of each connecting means F. The base B of electrically non-conductive material carries a hollow cap C also made of a suitable electrically non-conductive material. This cap C defines with the base B an interior chamber in which are located the disconnecting diode D and, in accordance with an important feature of the invention, the Zener diode Z, these components Z and D being connected in series and in opposition to each other between the rod A and the tube A'.

The connecting means F can be moved up and down, as viewed in FIG. 2, by the operator, in order to provide selected connections between the lines and columns. The conductive tube A' is always electrically connected with the line L in the illustrated example, with the electrical connection being provided not only at the opening through which the tube A' passes but also by the gripping fingers at each crossing location J. However, the rod A will engage the gripping fingers of a column K only when a connection is to be provided at a location J. Thus the structure is shown in FIG. 2 with the connecting means F depressed in order to provide the illustrated electrical connection at the location J. in order to interrupt this connection the connecting means F is raised so that the rod A no longer engages the column K. For this purpose the connecting means F of FIG. 2 can simply be pulled up by the operator, and any suitable detent devices or the like may be utilized so that the operator can sense when the connecting means F is in a connecting or disconnecting position, although these positions will also be readily apparent by noting whether a particular connecting means F is depressed or raised.

Of course, the invention is not to be limited to the particular details described above and shown in the drawing, but rather includes all technical equivalents of the features described by way of example, considered either separately or in combination, and included within the scope of the claims which follow.

What is claimed is:

1. In a system for providing controls according to a given code and/or program, a matrix composed of a plurality of mutually insulated electrically conductive lines and a plurality of mutually insulated electrically conductive columns which cross said lines at predetermined locations, and a plurality of connecting means respectively situated at said locations for selectively electrically connecting said lines and columns to each other at said locations where they cross each other, supply means electrically connected with said lines for supplying a given group of input signals thereto, and receiving means electrically connected with said columns for detecting a given group of output signals received from said columns and for providing predetermined controls in accordance with said group of detected signals received from said columns, said plurality of connecting means respectively including connecting circuits each of which includes a Zener diode connected in an inverse position between a line and column, and said Zener diodes having threshold voltages respectively distributed among a plurality of different threshold voltages which respectively have different discrete magnitudes, and at least one of said groups of signals also having voltages distributed among a plurality of signal voltages which respectively have different discrete magnitudes corresponding to said magnitudes of said threshold voltages.

2. The combination of claim 1 and wherein each of said connecting circuits includes in series with said Zener diode thereof an ordinary diode of opposed polarity for assuring electrical disconnection of a line and column at a location where a line and column are disconnected from each other.

3. The combination of claim 1 and wherein said supply means includes a voltage source for providing a voltage of a value at least equal to the largest of said magnitudes, and said supply means having connected in series with said voltage source a means for selectively deriving therefrom at least one voltage which is a predetermined fraction of the voltage of said source.

4. The combination of claim 1 and wherein said receiving means includes a plurality of operational amplifier means for assuming either a rest condition or a saturated condition, and each of said operational amplifier means having a pair of inputs, said plurality of operational amplifier means being respectively electrically connected at one of their inputs to said plurality of columns, a source of reference potential and a plurality of polarizing circuit means respectively connected electrically thereto, the other of said inputs of said plurality of operational amplifier means being respectively connected electrically with said plurality of polarizing circuit means to be connected therethrough to said source of reference potential.

5. The combination of claim 4 and wherein said receiving means includes a plurality of similar operational amplifier means for each column with said plurality of operational amplifier means for each column respectively having one input thereof connected in parallel to said column, said polarizing circuit means including for each column a series of successive polarizing elements connected in cascade in one circuit and having terminals respectively situated therebetween, and the other of the inputs of the plurality of similar operational amplifiers for each column being respectively connected to the latter terminals.

6. The combination of claim 5 and wherein each of said polarizing elements includes at least one Zener diode.

7. The combination of claim 5 and wherein said receiving means includes for each column an additional operational amplifier means having a pair of inputs one of which is connected to said column and the other of which is connected to said source of reference potential with the inputs of said additional operational amplifier means being reversed with respect to the inputs of the remaining similar operational amplifier means provided for each column.

8. The combination of claim 4 and wherein said receiving means includes for each column a means for reducing the reference potential of each column.

9. The combination of claim 4 and wherein said supply means includes a source of voltage and a timing means connected between said source of voltage and said lines for timing the supply of said group of input signals thereto, said receiving means including a plurality of bistable control means electrically connected with said plurality of operational amplifier means for providing signals for starting and stopping an operation.

* * * * *